United States Patent [19]
Yamamuro

[11] Patent Number: 5,103,440
[45] Date of Patent: Apr. 7, 1992

[54] TRACK ACCESS ERROR CORRECTION APPARATUS FOR MOVING AN OPTICAL HEAD FROM ONE TRACK LOCATION TO ANOTHER TRACK LOCATION ON AN OPTICAL DISC

[75] Inventor: Mikio Yamamuro, Kawasaki, Japan

[73] Assignee: Kabushiki Kaisha Toshiba, Kawasaki, Japan

[21] Appl. No.: 714,975

[22] Filed: Jun. 13, 1991

Related U.S. Application Data

[63] Continuation of Ser. No. 226,311, Jul. 29, 1988, abandoned.

[30] Foreign Application Priority Data

Jul. 30, 1987 [JP] Japan ................ 62-190883

[51] Int. Cl.$^5$ ............................ G11B 7/085
[52] U.S. Cl. ................. 369/44.28; 369/44.29; 369/44.32; 369/54
[58] Field of Search ........... 369/32, 44.27–44.29, 369/44.32, 44.35, 53–54

[56] References Cited

U.S. PATENT DOCUMENTS

| | | | |
|---|---|---|---|
| 4,598,394 | 7/1986 | Nonaka | 369/44.28 |
| 4,613,963 | 9/1986 | Hirano | 369/44.28 |
| 4,663,750 | 5/1987 | Hamanaka et al. | |
| 4,677,602 | 6/1987 | Okano et al. | 369/44.28 X |
| 4,698,796 | 10/1987 | Kimura | 369/44.28 |
| 4,703,468 | 10/1987 | Baba et al. | 369/44.32 |
| 4,819,219 | 4/1989 | Nagano | 369/44.28 X |
| 4,839,876 | 6/1989 | Fennema | 369/44.28 X |
| 4,853,918 | 8/1989 | Kobayashi et al. | 369/44.28 |
| 4,879,707 | 11/1989 | Getreuer et al. | 369/44.28 |

FOREIGN PATENT DOCUMENTS 0127845 12/1984 European Pat. Off. .
3438260A1 5/1985 Fed. Rep. of Germany .

*Primary Examiner*—Roy N. Envall, Jr.
*Assistant Examiner*—W. R. Young
*Attorney, Agent, or Firm*—Finnegan, Henderson, Farabow, Garrett, and Dunner

[57] ABSTRACT

An optical apparatus for focusing a light beam onto an object having a first track and a second track for guiding the light beam, includes an optical element for directing the light beam onto the object, a detector for detecting the light beam from the object and for generating a tracking-error signal representing a location of the light beam with respect to the first track of the object, and an actuator for moving the optical element from the first track toward the second track. The optical apparatus further includes a generator for generating a track compensating signal corresponding to the distance between the first track and the second track, and an adder for adding the tracking-error signal generated by the detector and the track compensating signal generated by the generator. An adjuster is provided for adjusting the location of the optical element with respect to the second track of the object in response to the signal added by the adder.

3 Claims, 4 Drawing Sheets

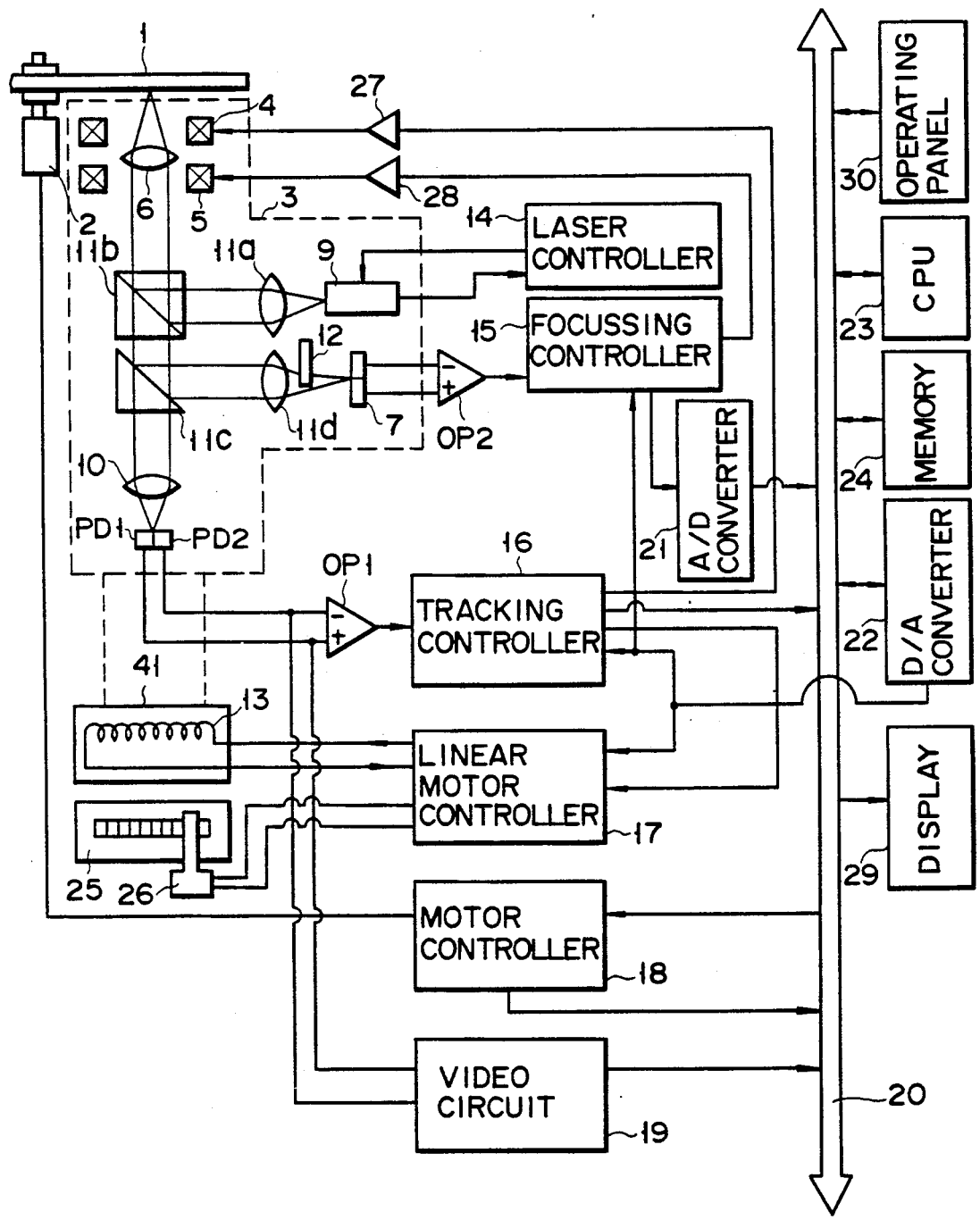
F I G. 1

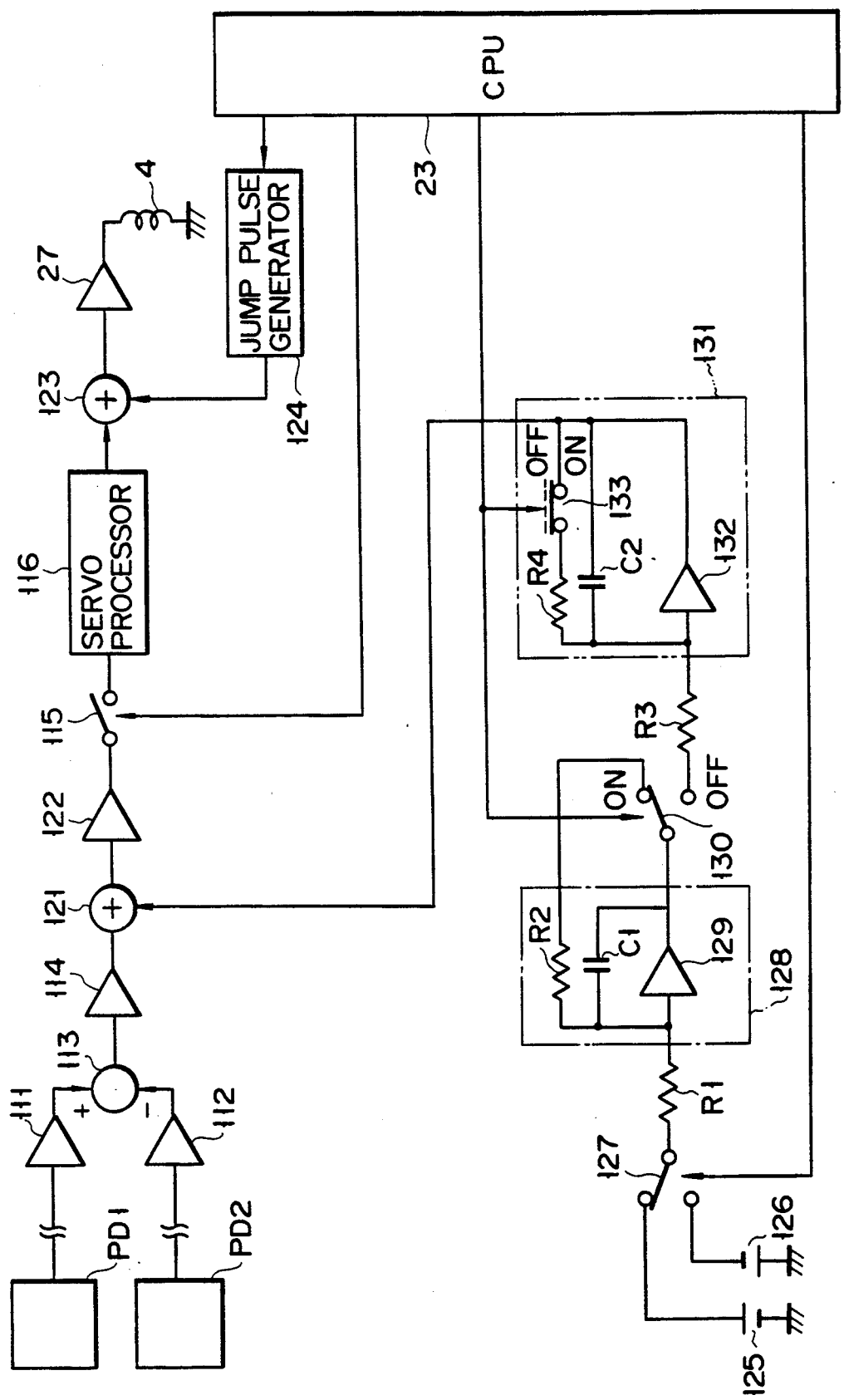
F I G. 2

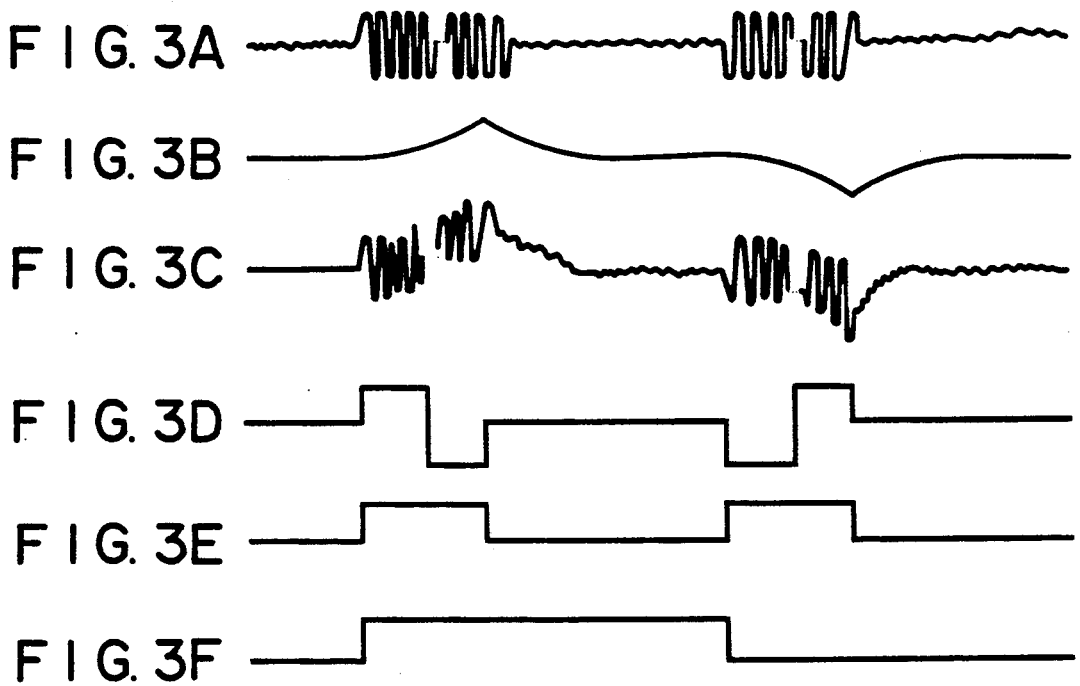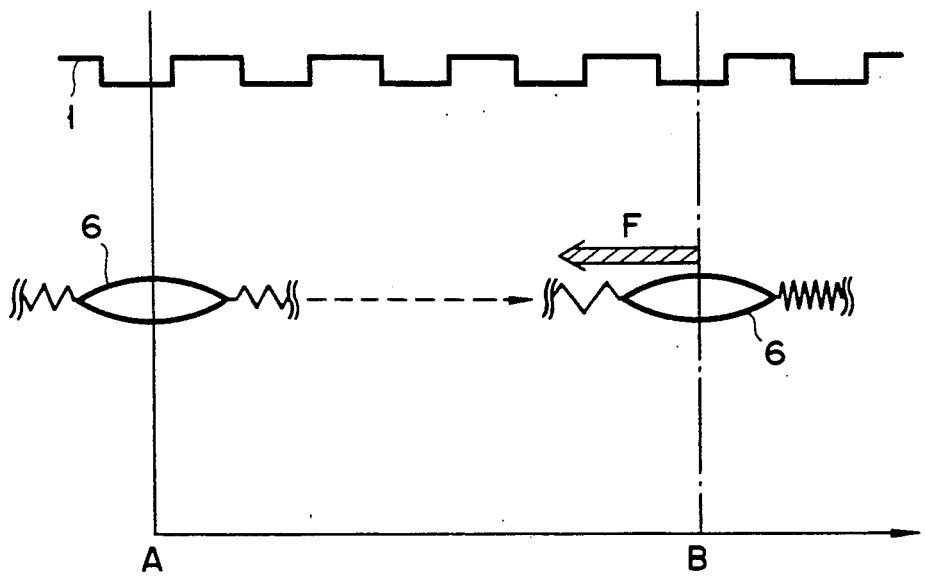
FIG. 4

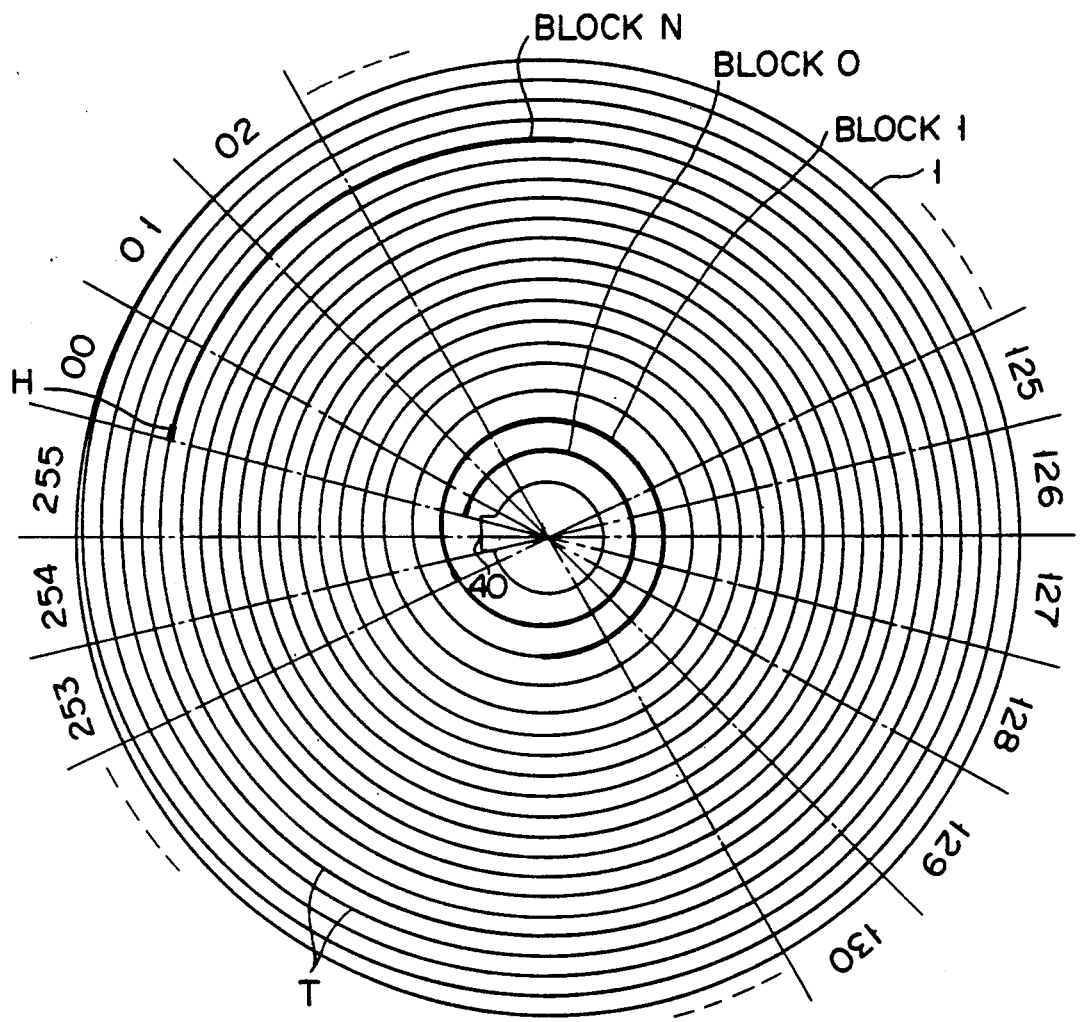
F I G. 5

TRACK ACCESS ERROR CORRECTION APPARATUS FOR MOVING AN OPTICAL HEAD FROM ONE TRACK LOCATION TO ANOTHER TRACK LOCATION ON AN OPTICAL DISC

This application is a continuation of application Ser. No. 07/226,311, filed July 29, 1988, now abandoned.

BACKGROUND OF THE INVENTION

1. Field of the Invention

This invention relates to an optical information reproducing apparatus, and more particularly to a track accessing circuit which can perform steady and exact track access functions in connection with an optical information reproducing operation. 2. Description of the Related Art In general, an optical information reproducing apparatus uses an optical pick-up to reproduce optical information from a recording medium. A recording medium, which is called an optical disc, has a plurality of sectors each extending radially thereof and tracks provided concentrically thereon. A number of pits which represent information to be recorded, are formed on each track. The length of the pits differs according to what information is recorded. The operation of reading out or reproducing information recorded is effected as follows:

First, a laser beam is applied to a preset track on a recording medium via an optical pick-up having an objective lens. The laser beam is reflected toward the objective lens and the amount of the beam reflected varies depending on the presence or absence of the pit. When the laser beam is applied to a position having no pit, an intense light goes back toward the objective lens. In contrast, when the laser beam hits the pit, the beam diffracts and a portion of the light reflected is not transmitted toward the objective lens, thus reducing the amount of the reflected light incident on the objective lens. Therefore, information can be divided from detecting the difference in the amount of light reflected.

To detect the difference, a light sensing device is used.

In order to precisely reproduce a signal by applying a laser beam to the optical disc, it is necessary to control the optical pick-up or objective lens so that the laser beam can always be applied to a preset pit position in a preset track. That is, when the laser beam spot is deviated from the preset pit position because of the eccentricity of the disc or distortion of the track, a servo system operates to return the optical pick-up to the preset pit position. In general, the above control operation is called tracking servo control. As the tracking servo control, a three spots method a wobbling method, a push-pull method and the like are known.

Japanese patent publication No. 58-55566 discloses a tracking servo control in which an electrical feedback circuit is provided for controlling a motor device used for shifting a lens, the amount of the shift depending on a voltage supplied from a photoelectric converter which converts light reflected from a track into electrical signals.

When a signal is reproduced from the disc, it is necessary for the optical pick-up to access the preset pit position of the preset track in order to readout information recorded on the disc. This is called track access. The track access method includes the following three methods. The first method is t move the entire optical pick-up so as to access a preset track position; the second method is to move only the objective lens without moving the optical pick-up so as to jump a plurality of tracks at one time: and the third method is to move the objective lens so as to jump the track one by one and access a preset track position.

The first method is used for access of above 50 gm (corresponding to 30 tracks). However, the first method provides imprecise access and takes a long access time. Further, in the third method, the access precision is high but it takes the longest access time among the three methods.

Now, a case is explained in which the objective lens jumps 30 tracks or above by utilizing the second method.

In this case, since the objective lens travels over a distance of 30 tracks or above, the deviation of the objective lens from the optical pick-up becomes large. Since both ends of the objective lens are supported by a pair of leaf springs respectively one of the leaf springs is compressed and the other is expanded after the movement of the objective lens. In this case, the objective lens tend to go back to the original position by restoring force of the leaf springs, creating deviation from the position accessed by the objective lens.

In order to solve the above problem, a laser beam spot will not be set exactly on the pit but can be slightly deviated from the pit or only partly set on the pit. From this, a track-error signal is generated, and is supplied to a driving coil for driving the objective lens oppositely from its restoring direction. Thus, this signal is used for preventing the objective lens from being deviated from the accessed position.

However, in this method, time required for the track-error signal to be supplied to the driving coil can often become longer than that for the leaf springs to be restored. In such a case, the objective lens can be deviated from the accessed position by the restoring force of the leaf springs before the driving coil is activated by the track-error signal to maintain the objective lens at a position accessed. Therefore, it has long been required to develop a track accessing circuit having stable functions and capable of preventing the objective lens from being deviated from the accessed track position even in the case of performing access operation over 30 tracks or above.

SUMMARY OF THE INVENTION

An object of this invention is to provide a track accessing circuit which can perform the steady and exact track access functions in order to solve the problems described above.

This object can be attained by an optical apparatus for focusing a light beam onto an object, the object having a first track and a second track for guiding the light beam, comprising means for directing the light beam onto the object, means for detecting the light beam from the object so as to generating a track-error signal representing a location of the light beam with respect to the track of the object, means for moving the directing means from the first track toward the second track, means for generating a track compensating signal corresponding to the distance between the first track and the second track, means for adding the track-error signal generated by the detecting means and the track compensating signal generated by the generating means, and means for adjusting the location of the directing means with respect to the second track of the object in response to the signal added by the adding means.

BRIEF DESCRIPTION OF THE DRAWINGS

The foregoing aspects and other features of the invention are explained in the following description taken in conjunction with the accompanying drawings wherein:

FIG. 1 is a schematic block diagram of an optical information reproducing apparatus in which a track accessing circuit of this invention is used;

FIG. 2 is a detailed diagram of the track accessing circuit of this invention;

FIGS. 3A to 3F are signal waveforms formed in connection with the track access operation;

FIG. 4 is a diagram indicating the direction of force applied to an objective lens after the access operation is completed; and FIG. 5 shows an optical disc surface on which optical data in the form of pits is recorded.

DETAILED DESCRIPTION OF THE PREFERRED EMBODIMENT

There will now be described an embodiment of this invention with reference to the accompanying drawings.

FIG. 5 shows the surface of optical disk 1 which is used for recording information. A plurality of tracks T are spirally formed on the surface of optical disc 1. A number of pits, which represent information to be recorded, are formed on each of the tracks. Optical disk 1 comprises a disk-like base formed of glass or plastic, and a metal coating (such as tellurium or bismuth coating) coated thereon in a doughnut-like shape. Optical disk 1 has reference position mark 40 as a notch portion formed near the central portion of the metal coating. The surface of optical disk 1 is divided into a plurality of sectors, "00" to "255", with reference position mark 40 being located at sector "00". Each track is divided into blocks each of which has block header H at its start position.

Optical disc 1 is rotated at a constant speed, for example, by motor 2 which is controlled by means of motor controller 18. Information is reproduced from optical disc 1 by means of optical pick-up 3. Driving coil 13 is the movable portion of linear motor 41. Optical scale 25, which is connected to linear motor 41, is used for detecting a position of linear motor 41 by linear motor position detector 26. Optical pick-up 3 is fixed on driving coil 13, and driving coil 13 is connected to linear motor controller 17. Also, linear motor position detector 26 is connected to linear motor controller 17. Linear motor position detector 26 detects optical scale 25 connected to optical pick-up 3 and generates a position signal corresponding to the position of linear motor 41 detected. The fixed portion of the linear motor includes a permanent magnet (not shown). Optical pick-up 3 can be moved in a radial direction of optical disc 1 when linear motor controller 17 excites driving Coil 13. Optical pick-up 3 comprises objective lens 6, beam splitter 11b, half prism 11c, collimator lens 11a, condenser lens 10, condenser lens 11d, knife edge 12, a pair of focus position sensors 7, semiconductor laser 9, driving coils 4 and 5, and a pair of photosensors PD1 and PD2.

Further, both ends of objective lens 6 are held in optical pick-up 3 by means of leaf springs (not shown). Objective lens 6 can be moved in a focusing direction (axial direction of the lens) by means of driving coil 5, and in a tracking direction (which is perpendicular to the axis of the lens) by means of driving coil 4.

When information is recorded or reproduced, semiconductor laser 9 is activated by means of laser controller 14. A light beam output from laser 9 is directed to collimator lens 11a for collimation. Beam splitter 11b serves to split the collimated light beam and send part of it toward objective lens 6. Objective lens 6 focuses on a desired track on optical disk 1. Light reflected from the track on optical disc 1 is directed to half prism 11c via objective lens 6 and beam splitter 11b which serves to split the reflected light into two components. One of the components separated by half prism 11c is led, via condenser lens 10, to a pair of photosensors PD1 and PD2, for being converted to electrical signals The other component is led to a pair of focus position sensors 7 via condenser lens 11d and knife edge 12.

Focus position sensor 7 produces an output signal corresponding to a position at which the laser beam is focused. The output signal is supplied as a focus error signal to focusing controller 15 via operational amplifier OP2. Focusing controller 15 supplies a voltage corresponding to the received focus error signal to focusing driving coil 5 via amplifier 28.

Two electrical signals output from photosensors PD1 and PD2 are supplied to operational amplifier OP1, which generates a track-error signal therefrom by subtracting one signal of the two electrical signals from the other. This track-error signal is supplied as a tracking control signal to driving coil 4 via amplifier 27, thus permitting objective lens 6 to be moved. The tracking control signal is also supplied to linear motor controller 17.

Further, the two output signals are supplied as reproduction signals to video circuit 19 which in turn converts the reproduction signal to a binary coded digital signal so as to reproduce the image information recorded on optical disc 1.

Laser controller 14, focusing controller 15, tracking servo controller 16, linear motor controller 17, motor controller 18 and video circuit 19 are connected to CPU 23 via bus line 20 and are controlled by CPU 23. CPU 23 executes a preset program stored in memory 24 in response to instructions supplied from operation panel 30 to supply control signals to corresponding portions. A/D converter 21 is used to make it possible to transfer information between focusing controller 15 and CPU 23. D/A converter 22 is used to permit information transfer between CPU 23 and each of tracking servo controller 16 and linear motor controller 17.

FIG. 2 shows the detailed construction of the track accessing circuit of this invention. The reflected light from optical disc 1 shown in FIG. 1 is transmitted to photosensors PD1 and PD2 via the optical pick-up 3 including objective lens 6. Two output signals from photosensors PD1 and PD2 are supplied to subtracter circuit 113 via amplifiers 111 and 112, respectively. Subtracter circuit 113 derives out a difference between the output signals, and supplies the subtraction result as a track-error signal. Then, the error signal is supplied to servo processor 116 via amplifier 114 and switching circuit 115 which is normally set in the ON state by a track ON/OFF control signal from CPU 23. Servo processor 116 generates a drive signal in response to the track-error signal to energize driving coil 4 which is connected thereto via adder 123 and amplifier 27. The drive signal is supplied to driving coil 4 via adder 123 and amplifier 27 to cause an electromagnetic force to be generated in driving coil 4, so that objective lens 6 can be moved. Thus, the track access operation can be effected.

When objective lens 6 is track-jumped or track-accessed to a specified track, switch 115 is turned off by a track ON/OFF control signal from CPU 23, making the tracking servo loop open. At this time, a jump pulse generated from jump pulse generator 124 is supplied to adder 123.

In FIG. 2, blocks denoted by reference numerals 128 and 131 are respectively first and second integration circuits which are used to generate a D.C. bias signal as a track compensating signal. The compensating signal is supplied together with a track-error signal generated at the time of completion of track jump operation to adder 121 and added together.

Reference numerals 125 and 126 in FIG. 2 denote D.C. bias sources which are connected to have opposite polarities. Selection of D.C. bias source 125 or 126 is effected by selectively setting switch 127 by a jump direction selection signal which is supplied from CPU 23 to specify the track jump direction of objective lens 6. A bias voltage supplied from one of D.C. bias sources 125 and 126 selected by means of switch 127 is supplied to first integration circuit 128 via resistor R1. First integration circuit 128 is constituted by amplifier 129, capacitor C1 and resistor R2. The integrating operation of first integration circuit 128 is started by turning on switch 130 by a jump operation signal which is supplied from CPU 23 and indicates that objective lens 6 is under track access operation. The time constant of capacitor C1 and resistor R2 is set small so as to make the discharging time of capacitor C1 short.

An output signal from first integration circuit 128 is supplied to second integration circuit 131 via resistor R3. Second integration circuit 131 is constituted by amplifier 132, capacitor C2 and resistor R4. The integrating operation of second integration circuit 128 is started by turning on switch 133 by a jump operation signal which is supplied from CPU 23. The time constant of capacitor C2 and resistor R4 is set according to the response time of the tracking servo loop.

An output signal from second integration circuit 131 is supplied as a tracking bias signal or a track compensating signal to adder 121. Adder 121 adds the compensating signal and a track-error signal generated from subtracter 113. The addition result is supplied as a tracking control signal to driving coil 4 for driving objective lens 6.

The operation of the above track access circuit is explained with reference to the waveform diagrams shown in FIG. 3. In a case where objective lens 6 is jumped to a specified track position, for example, switch 115 which is normally set in the ON state is turned off by an ON/OFF control signal from CPU 23, thus making the tracking servo loop open. Switch 127 is turned on or off by a jump direction selection signal (shown in FIG. 3F) according to the jumping direction of objective lens 6, thus selecting one of the D.C. bias sources corresponding to the direction of objective lens 6.

A jump pulse shown in FIG. 3D is generated from jump pulse generator 124 and supplied to adder 123. As described before, the sum of the track-error signal and jump pulse signal is generated as an output signal of adder 123, and is supplied as a tracking control signal to driving coil 4 via amplifier 27.

Switches 130 and 133 are turned on by the jump operation signal (shown in FIG. 3E) to start the integrating operations of first and second integration circuits 128 and 131. The integration operations cause a voltage varying in proportion to the square of time as shown in FIG. 3B to be supplied as a track compensating signal (D.C. bias signal) to adder 121. The track compensating signal is added with the track-error signal shown in FIG. 3A by means of adder 121. As a result, a track-error signal shown in FIG. 3C is generated from adder 121. The tracking control signal is obtained by superposing the track-error signal on the compensating signal and therefore has such a waveform as shown in FIG. 3C. The compensating signal is derived by performing two integration operations, but can be derived by other methods.

FIG. 4 indicates the direction of force applied to objective lens 6 in a case where objective lens 6 is moved along optical disc 1 to access track B from track A. As shown in FIG. 4, force F is applied to objective lens 6 in a direction opposite to the direction of movement of objective lens 6 by the restoration force of the leaf springs (not shown) after the access operation is completed.

In FIG. 2, the jump pulse from jump pulse generator 124 is set to a "0" level after objective lens 6 has accessed a specified track. At the same time, the integration operations of first and second integration circuits 128 and 131 are interrupted. Further, switch 115 is turned on by the track ON/OFF control signal from CPU 23 to close the tracking servo loop. Thus, the tracking control signal which is the sum of the compensating signal and the track-error signal is supplied to driving coil 4 via adder 122 and switch 115 which is now in the ON state. Therefore, objective lens 6 is driven by means of the driving coil 4 supplied with a tracking control signal which includes a D.C. component of the compensating signal and is thus larger than the tracking control signal including only the track-error signal. The driving force of the driving coil 4 is sufficiently larger than restoration force F of objective lens 6, and therefore objective lens 6 can be held in the central position of the accessed track.

As described before, the time constant of second integration circuit 131 is determined according to the response time of the tracking servo loop. Therefore, even if the compensating signal is reduced in amplitude according to the response of the tracking servo loop, objective lens 6 can be held in the central position of the accessed track.

As described above, a D.C. bias voltage as a compensating signal corresponding to the jumping distance of objective lens 6 is added to the track-error signal, and a tracking control signal obtained by adding the D.C. bias to the track-error signal is used to drive the objective lens 6 oppositely when objective lens 6 has accessed a desired track position. In this way, objective lens 6 can be held in substantially the central position of the track accessed. Thus, it is possible for objective lens 6 to have access of a long distance (50 to 200 $\mu$m) instead of accessing by optical pick-up 3.

Thus, the track access of 50–200 $\mu$m by objective lens 6 which was considered impossible in the prior art becomes possible, and the conditions of exact and high-speed track access can be satisfied.

It should be understood that while the present invention was described in connection with one specific embodiment, other modification will become apparent to one skilled in the art upon a study of the specification, drawings and following claims.

What is claimed is:

1. Track accessing apparatus for moving an optical head from one track location to another track location on a recording medium, comprising:
   a positive direct current voltage source;
   a negative direct current voltage source;
   movable means for directing a light beam from the optical head to a track location on the recording medium;
   means for detecting a positional deviation of said light beam from the center of said track location to produce a track error signal representing the detected positional deviation;
   means, selectively coupled to said positive and negative direct current voltage sources, for producing a track compensating signal including a DC bias signal; and
   means for moving said light beam directing means in accordance with a track control signal representing said track error signal and said track compensating signal.

2. The track accessing apparatus according to claim 1, wherein said track compensating signal producing means includes at least one means for integrating a voltage from a selected one of the positive and negative direct current voltage sources to produce a direct current bias voltage.

3. The track accessing apparatus according to claim 1, wherein said track compensating signal producing means includes means for adding the track error signal and the track compensating signal to produce said track control signal.

* * * * *